(12) United States Patent
Xu (10) Patent No.: US 9,690,148 B2
(45) Date of Patent: Jun. 27, 2017

(54) LIQUID CRYSTAL DISPLAY PANEL AND DEVICE

(71) Applicant: SHENZHEN CHINA STAR OPTOELECTRONICS TECHNOLOGY CO., LTD., Shenzhen, Guangdong (CN)

(72) Inventor: Xiangyang Xu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 201 days.

(21) Appl. No.: 14/655,186

(22) PCT Filed: Jan. 27, 2015

(86) PCT No.: PCT/CN2015/071586
§ 371 (c)(1),
(2) Date: Jun. 24, 2015

(87) PCT Pub. No.: WO2016/115746
PCT Pub. Date: Jul. 28, 2016

(65) Prior Publication Data
US 2016/0313592 A1      Oct. 27, 2016

(30) Foreign Application Priority Data

Jan. 21, 2015   (CN) .......................... 2015 1 0031132

(51) Int. Cl.
*G02F 1/1337*     (2006.01)
*G02F 1/1343*     (2006.01)
(Continued)

(52) U.S. Cl.
CPC ........ *G02F 1/13439* (2013.01); *G02F 1/1368* (2013.01); *G02F 1/133514* (2013.01);
(Continued)

(58) Field of Classification Search
CPC ..... G02F 1/1337; G02F 1/1333; G02F 1/1343
See application file for complete search history.

(56) References Cited

U.S. PATENT DOCUMENTS

2011/0001691 A1   1/2011   Hashimoto et al.
2012/0182510 A1   7/2012   Kim et al.
(Continued)

FOREIGN PATENT DOCUMENTS

CN      101925853 A    12/2010
CN      102213872 A    10/2011
(Continued)

*Primary Examiner* — Timothy L Rude
(74) *Attorney, Agent, or Firm* — Ladas & Parry LLP (57) ABSTRACT

The present invention provides a liquid crystal display panel and device. The liquid crystal display panel includes a first subpixel and a second subpixel each having a plurality of display domains. The first subpixel includes a first pixel electrode and a first common electrode. The second subpixel includes a second pixel electrode and a second common electrode. The display domains of the first subpixel and the display domains of the second subpixel are respectively formed by patterning the first common electrode and the second pixel electrode.

15 Claims, 6 Drawing Sheets

(51) Int. Cl.
*G02F 1/1335* (2006.01)
*G02F 1/1362* (2006.01)
*G02F 1/1368* (2006.01)
G02F 1/1333 (2006.01)

(52) U.S. Cl.
CPC .. G02F 1/134309 (2013.01); G02F 1/136286 (2013.01); *G02F 2001/133342* (2013.01); *G02F 2001/134318* (2013.01); *G02F 2001/134345* (2013.01); *G02F 2201/121* (2013.01); *G02F 2201/123* (2013.01)

(56) References Cited

U.S. PATENT DOCUMENTS

| | | | |
|---|---|---|---|
| 2013/0215341 A1 | 8/2013 | Rho et al. | |
| 2015/0146117 A1* | 5/2015 | Lee | G02B 27/26 349/15 |
| 2015/0248042 A1* | 9/2015 | Kim | G02F 1/134336 349/139 |
| 2015/0268524 A1* | 9/2015 | Hirosawa | G02F 1/136286 349/138 |
| 2015/0277166 A1* | 10/2015 | Kim | G02F 1/133707 349/128 |
| 2015/0286102 A1 | 10/2015 | Lo et al. | |
| 2015/0322341 A1* | 11/2015 | Rho | C09K 19/3001 349/138 |
| 2015/0323845 A1* | 11/2015 | Chang | G02F 1/1343 349/42 |

FOREIGN PATENT DOCUMENTS

| | | |
|---|---|---|
| CN | 103676389 A | 3/2014 |
| KR | 20080100027 A | 11/2008 |

\* cited by examiner

LIQUID CRYSTAL DISPLAY PANEL AND DEVICE

BACKGROUND OF THE INVENTION

1. Field of the Invention

The present invention generally relates to the technical field of a liquid crystal display, and more particularly to a liquid crystal display panel and device.

2. Description of Prior Art

A liquid crystal display device is widely utilized in human's life and work. A viewing angle, a brightness level, and a color directly affect display effect of the liquid crystal display device.

In order to increase the viewing angle of a liquid crystal display panel, a pixel structure design with eight display domains is usually utilized. Each of pixel units is divided into two subpixels (one is large, and the other is small). A first subpixel comprises four display domains, and a second subpixel comprises four display domains. The display domains are formed by patterning pixel electrodes of the two subpixels.

Figure 1:
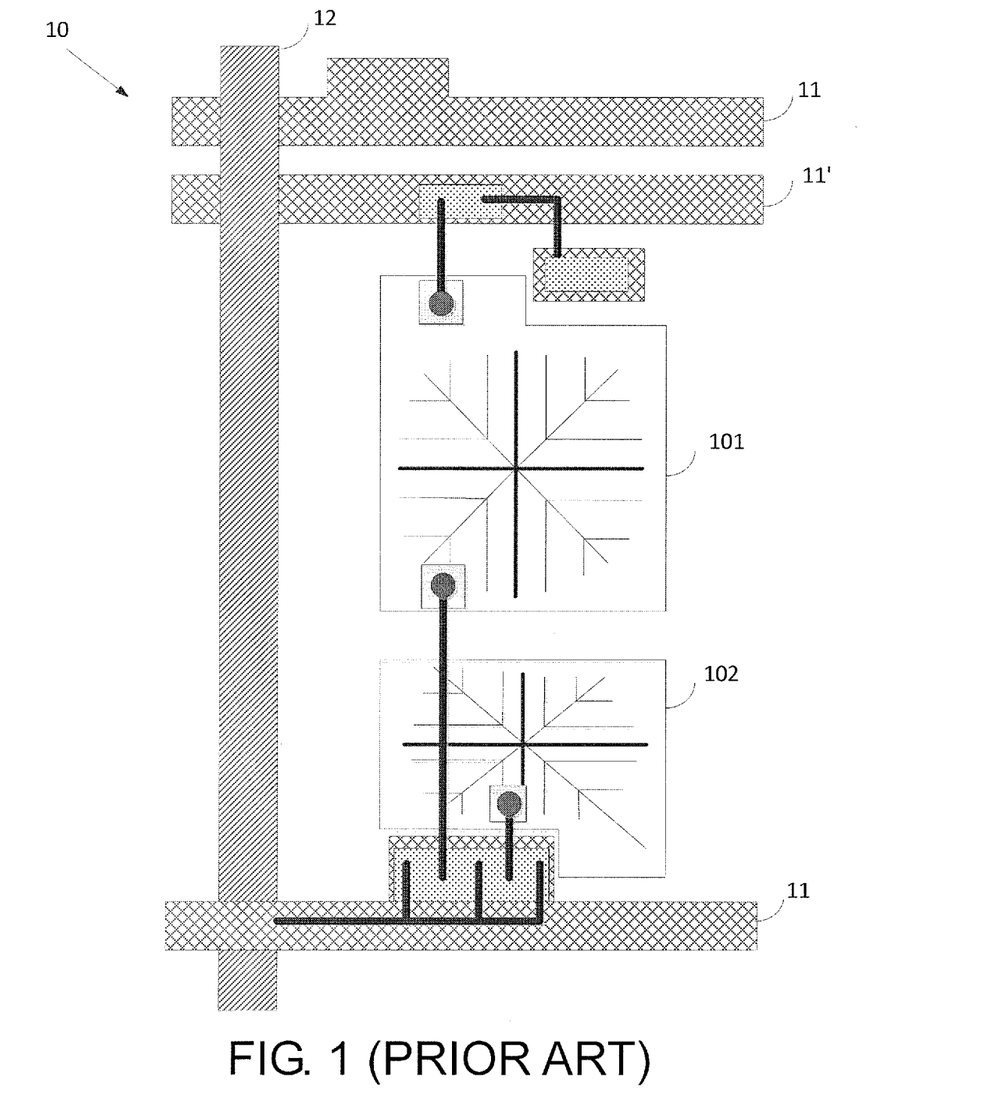
FIG. 1 is a structural diagram of an array substrate of a liquid crystal display panel in the prior art.
Figure 2:
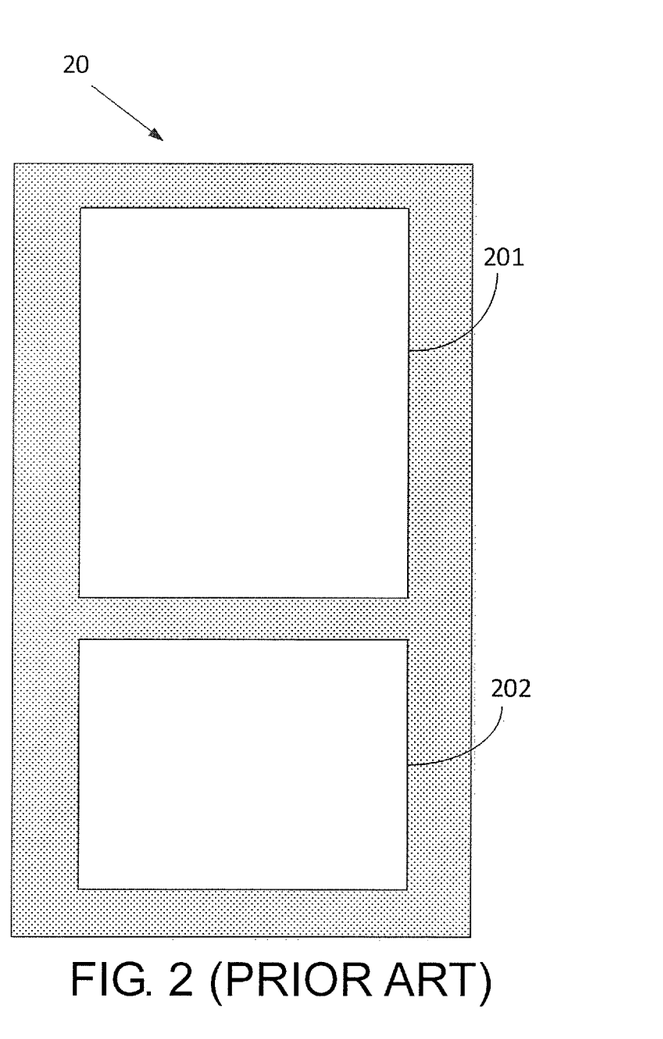
FIG. 2 is a structural diagram of a color filter substrate of the liquid crystal display panel in the prior art.
Figure 3:
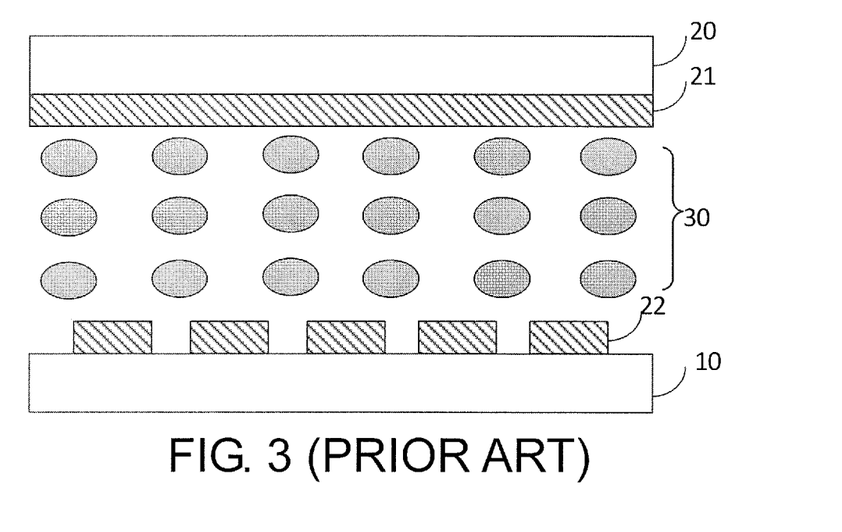
FIG. 3 is a cross-sectional diagram of the liquid crystal display panel in the prior art.

In conjunction with FIG. 3, a conventional liquid crystal display panel comprises an array substrate 10, a color filter substrate 20, a liquid crystal layer 30, a pixel electrode 22, and a common electrode 21. The liquid crystal layer 30 is positioned between the array substrate 10 and the color filter substrate 20. In conjunction with FIG. 1, the liquid crystal display panel comprises data lines 12, scan lines 11 and 11', and a plurality of pixel units which are defined by the data lines and the scan lines. Each of the pixel units comprises a first subpixel and a second subpixel. The first subpixel comprises a first array substrate, the liquid crystal layer, and a first color filter substrate. The first array substrate comprises a first pixel electrode. The first pixel electrode is 101 shown in FIG. 1. The first color filter substrate is disposed corresponding to the first array substrate and comprises a first common electrode. The first common electrode is 201 shown in FIG. 2.

The second subpixel comprises a second array substrate, the liquid crystal layer, and a second color filter substrate. The second array substrate comprises a second pixel electrode. The second pixel electrode is 102 shown in FIG. 1. The second color filter substrate is disposed corresponding to the second array substrate and comprises a second common electrode. The common electrode is 202 shown in FIG. 2.

However, when the display domains which are formed as mentioned above display in a double-sided manner, viewing angles are different and thus display effect is affected. Furthermore, each of the subpixels is driven by a thin film transistor. Since each of the pixel units is divided asymmetrically, that is, the area of the first subpixel is larger than the area of the second subpixel, the problem of color shift easily occurs. Moreover, the first subpixel and the second subpixel are respectively driven by a thin film transistor. In order to solve the problem of color shift, a charger-sharing thin film transistor and a sharing capacitor are disposed on the second subpixel. The charger-sharing thin film transistor and the sharing capacitor block light, and thus an aperture ratio is decreased. Furthermore, the charger-sharing thin film transistor and the sharing capacitor are required to be manufactured, and the manufacturing cost is increased.

Consequently, there is a need to provide a liquid crystal display panel and device for solving the above-mentioned problems in the prior art.

SUMMARY OF THE INVENTION

An objective of the present invention is to provide a liquid crystal display panel and device for solving the technical problem that the display effect is poor when a double-sided display is implemented in the prior art and further solving the technical problem that the color shift occurs and an aperture of the pixel units is decreased when pixel units are nonuniformly divided.

To solve the above-mentioned technical problems, the present invention is configured to a liquid crystal display panel, which comprises data lines, scan lines, and a plurality of pixel units which are defined by the data lines and the scan lines. Each of the pixel units comprises a first subpixel and a second subpixel. The first subpixel comprises a first array substrate comprising a first pixel electrode, a liquid crystal layer, and a first color filter substrate disposed corresponding to the first array substrate and comprising a first common electrode. The second subpixel comprises a second array substrate comprising a second pixel electrode, the liquid crystal layer, and a second color filter substrate disposed corresponding to the second array substrate and comprising a second common electrode. Amongst, the first subpixel comprises a plurality of display domains, and the display domains of the first subpixel are formed by patterning the first common electrode. The second subpixel comprises a plurality of display domains, and the display domains of the second subpixel are formed by patterning the second pixel electrode.

In the liquid crystal display panel of the present invention, a projected area of the first subpixel on the first array substrate is equal to a projected area of the second subpixel on the second array substrate.

In the liquid crystal display panel of the present invention, the pixel unit comprises a thin film transistor disposed therein. A control end of the thin film transistor is connected to one of the scan lines. An input end of the thin film transistor is connected to one of the data lines. An output end of the thin film transistor is connected to the first subpixel and the second subpixel.

In the liquid crystal display panel of the present invention, a number of the display domains of the first subpixel is equal to a number of the display domains of the second subpixel.

In the liquid crystal display panel of the present invention, the first common electrode comprises a first horizontal trunk part, a first vertical trunk part, and first branch parts. The first horizontal trunk part and the first vertical trunk part intersect vertically. The first branch parts extend outwardly from the first horizontal trunk part and the first vertical trunk part and are positioned in a common electrode area which is defined by the first horizontal trunk part and the first vertical trunk part. The second pixel electrode comprises a second horizontal trunk part, a second vertical trunk part, and second branch parts. The second horizontal trunk part and the second vertical trunk part intersect vertically. The second branch parts extend outwardly from the second horizontal trunk part and the second vertical trunk part and are positioned in a pixel electrode area which is defined by the second horizontal trunk part and the second vertical trunk part.

The present invention further provides a liquid crystal display panel, which comprises data lines, scan lines, and a plurality of pixel units which are defined by the data lines and the scan lines. Each of the pixel units comprises a first subpixel and a second subpixel. The first subpixel comprises a first array substrate comprising a first pixel electrode, a liquid crystal layer, and a first color filter substrate disposed corresponding to the first array substrate and comprising a first common electrode. The second subpixel comprises a second array substrate comprising a second pixel electrode, the liquid crystal layer, and a second color filter substrate disposed corresponding to the second array substrate and comprising a second common electrode. Amongst, the first subpixel comprises a plurality of display domains, and the display domains of the first subpixel are formed by patterning the first pixel electrode. The second subpixel comprises a plurality of display domains, and the display domains of the second subpixel are formed by patterning the second common electrode.

In the liquid crystal display panel of the present invention, a projected area of the first subpixel on the first array substrate is equal to a projected area of the second subpixel on the second array substrate.

In the liquid crystal display panel of the present invention, the pixel unit comprises a thin film transistor disposed therein. A control end of the thin film transistor is connected to one of the scan lines. An input end of the thin film transistor is connected to one of the data lines. An output end of the thin film transistor is connected to the first subpixel and the second subpixel.

In the liquid crystal display panel of the present invention, a number of the display domains of the first subpixel is equal to a number of the display domains of the second subpixel.

In the liquid crystal display panel of the present invention, the second common electrode comprises a third horizontal trunk part, a third vertical trunk part, and third branch parts. The third horizontal trunk part and the third vertical trunk part intersect vertically. The third branch parts extend outwardly from the third horizontal trunk part and the third vertical trunk part and are positioned in a common electrode area which is defined by the third horizontal trunk part and the third vertical trunk part. The first pixel electrode comprises a fourth horizontal trunk part, a fourth vertical trunk part, and fourth branch parts. The fourth horizontal trunk part and the fourth vertical trunk part intersect vertically. The fourth branch parts extend outwardly from the fourth horizontal trunk part and the fourth vertical trunk part and are positioned in a pixel electrode area which is defined by the fourth horizontal trunk part and the fourth vertical trunk part.

The present invention further provides a liquid crystal display device, which comprises a backlight module and a liquid crystal display panel. The liquid crystal display panel comprises data lines, scan lines, and a plurality of pixel units which are defined by the data lines and the scan lines. Each of the pixel units comprises a first subpixel and a second subpixel. The first subpixel comprises a first array substrate comprising a first pixel electrode, a liquid crystal layer, and a first color filter substrate disposed corresponding to the first array substrate and comprising a first common electrode. The second subpixel comprises a second array substrate comprising a second pixel electrode, the liquid crystal layer, and a second color filter substrate disposed corresponding to the second array substrate and comprising a second common electrode. Amongst, the first subpixel comprises a plurality of display domains, and the display domains of the first subpixel are formed by patterning the first common electrode. The second subpixel comprises a plurality of display domains, and the display domains of the second subpixel are formed by patterning the second pixel electrode.

In the liquid crystal display device of the present invention, a projected area of the first subpixel on the first array substrate is equal to a projected area of the second subpixel on the second array substrate.

In the liquid crystal display device of the present invention, the pixel unit comprises a thin film transistor disposed therein. A control end of the thin film transistor is connected to one of the scan lines. An input end of the thin film transistor is connected to one of the data lines. An output end of the thin film transistor is connected to the first subpixel and the second subpixel.

In the liquid crystal display device of the present invention, a number of the display domains of the first subpixel is equal to a number of the display domains of the second subpixel.

In the liquid crystal display device of the present invention, the first common electrode comprises a first horizontal trunk part, a first vertical trunk part, and first branch parts. The first horizontal trunk part and the first vertical trunk part intersect vertically. The first branch parts extend outwardly from the first horizontal trunk part and the first vertical trunk part and are positioned in a common electrode area which is defined by the first horizontal trunk part and the first vertical trunk part. The second pixel electrode comprises a second horizontal trunk part, a second vertical trunk part, and second branch parts. The second horizontal trunk part and the second vertical trunk part intersect vertically. The second branch parts extend outwardly from the second horizontal trunk part and the second vertical trunk part and are positioned in a pixel electrode area which is defined by the second horizontal trunk part and the second vertical trunk part.

In the liquid crystal display panel and device of the present invention, the display domains patterns are formed by patterning the electrodes, thereby solving the technical problem that the display effect is poor when the double-sided display is implemented. Furthermore, each of the pixel units is divided into two subpixels which have the same area, such that the problem of color shift is solved when the subpixels are asymmetrical, the aperture ratio of the pixel units is increased, and the manufacturing cost is decreased.

DETAILED DESCRIPTION OF THE INVENTION

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto. In the drawings, structure-like elements are labeled with like reference numerals.

Figure 4:
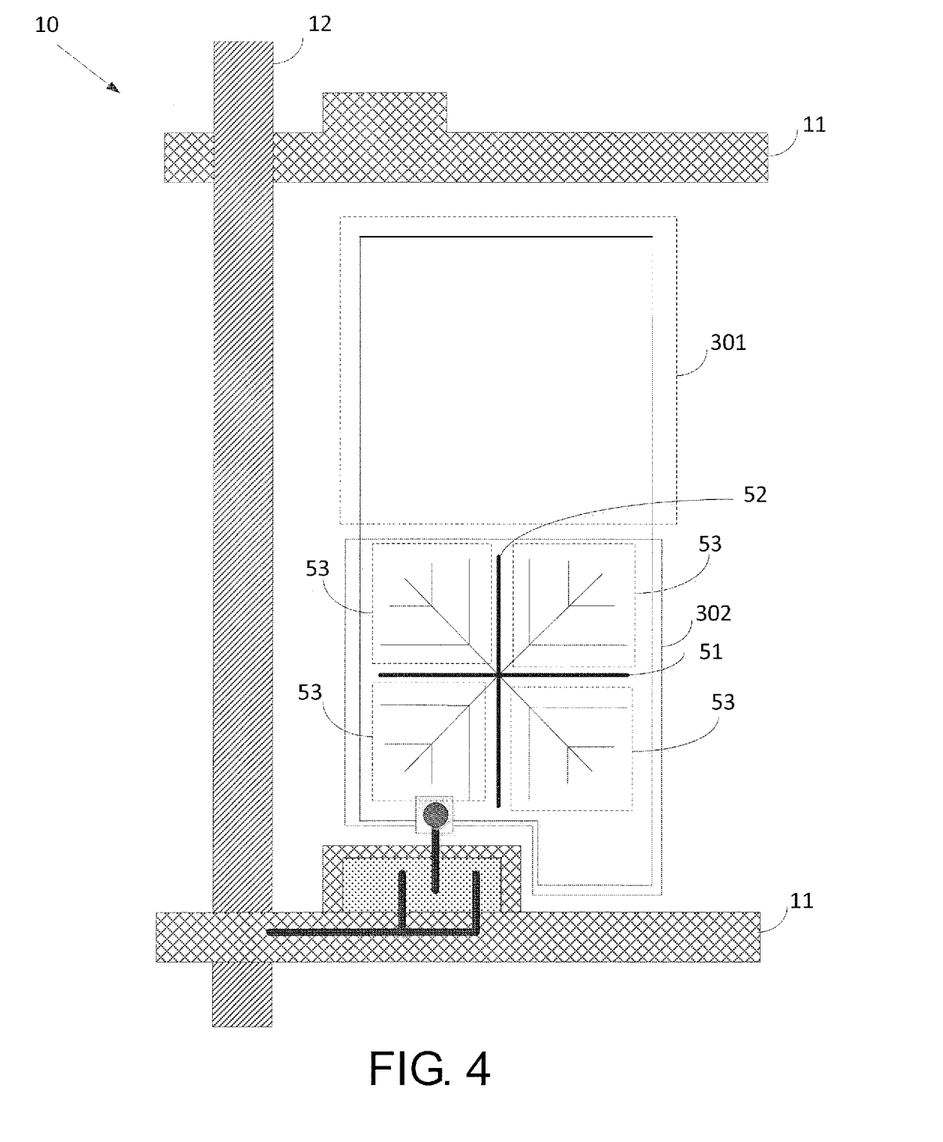
FIG. 4 is a structural diagram of an array substrate of a liquid crystal display panel in accordance with the present invention.

Please refer to FIG. 4. FIG. 4 is a structural diagram of an array substrate of a liquid crystal display panel in accordance with the present invention.

Figure 6:
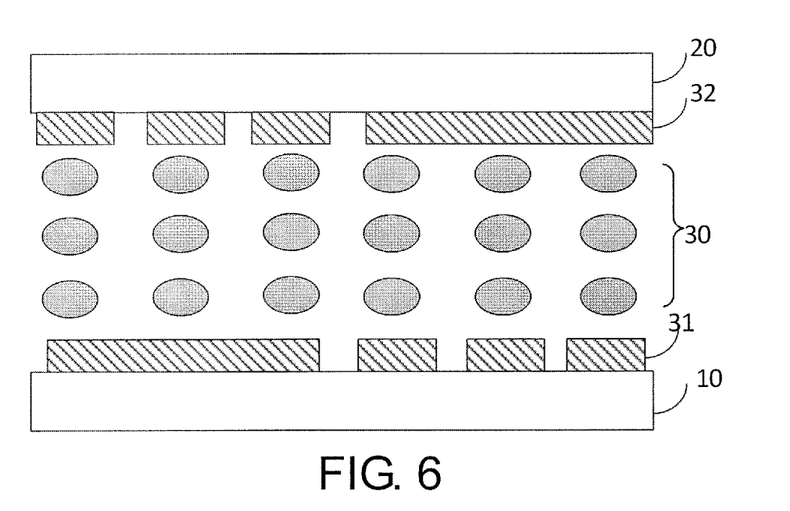
FIG. 6 is a cross-sectional diagram of the liquid crystal display panel in accordance with the present invention.

In conjunction with FIG. 6, the liquid crystal display panel comprises an array substrate 10, a color filter substrate 20, a liquid crystal layer 30, a pixel electrode 31, and a common electrode 32. The liquid crystal layer 30 is positioned between the array substrate 10 and the color filter substrate 20. The array substrate 10 comprises a first array substrate and a second array substrate. The color filter substrate 20 comprises a first color filter substrate and a second color filter substrate.

In conjunction with FIG. 4, the liquid crystal display panel comprises data lines 12, scan lines 11, and a plurality of pixel units which are defined by the data lines 12 and the scan lines 11. Each of the pixel units comprises a first subpixel and a second subpixel. The first subpixel comprises the first array substrate, the liquid crystal layer, and the first color filter substrate. The first array substrate comprises a first pixel electrode. The first color filter substrate is disposed corresponding to the first array substrate and comprises a first common electrode.

The second subpixel comprises the second array substrate, the liquid crystal layer, and the second color filter substrate. The second array substrate comprises a second pixel electrode. The second color filter substrate is disposed corresponding to the second array substrate and comprises a second common electrode.

The first pixel electrode is 301 shown in FIG. 4. The second pixel electrode is 302 shown in FIG. 4. The first common electrode is 401 shown in FIG. 5. The second common electrode is 402 shown in FIG. 5. The pixel electrode 31 comprises the first pixel electrode 301 and the second pixel electrode 302. The common electrode 32 comprises the first common electrode 401 and the second common electrode 402.

Figure 5:
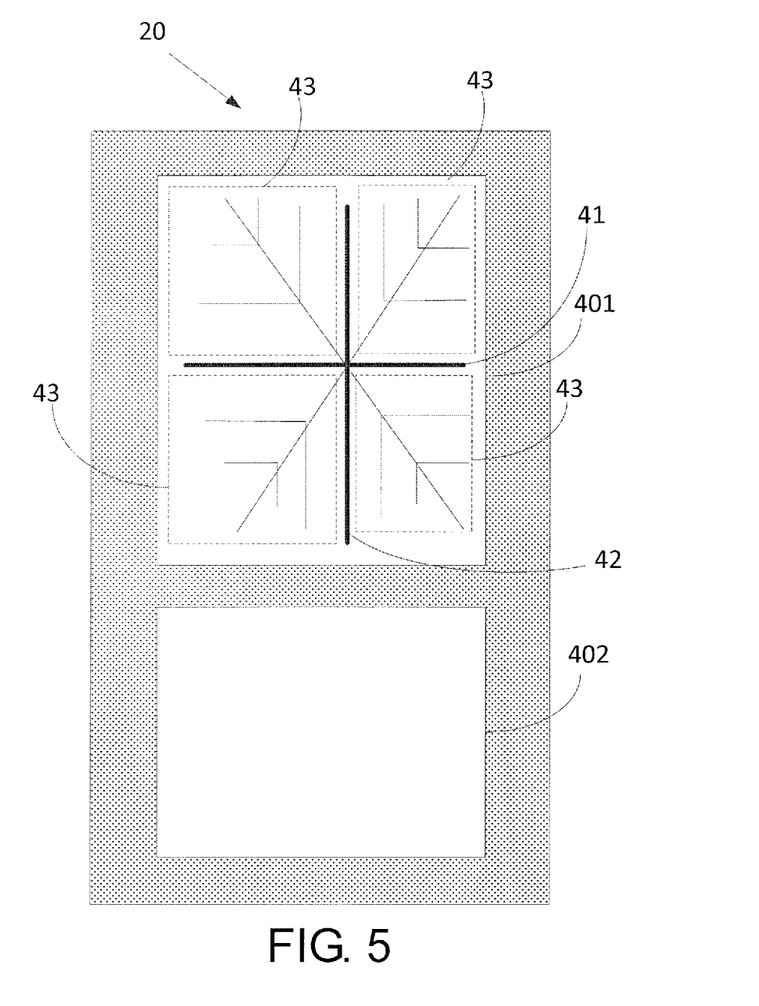
FIG. 5 is a structural diagram of a color filter substrate of the liquid crystal display panel in accordance with the present invention.

Amongst, the first subpixel comprises a plurality of display domains. The display domains of the first subpixel are formed by patterning the first common electrode 401.

The second subpixel comprises a plurality of display domains. The display domains of the second subpixel are formed by patterning the second pixel electrode 302.

Apparently, the display domains of the first subpixel are formed by the first common electrode. The display domains of the second subpixel are formed by the second pixel electrode. Accordingly, viewing angles are the same when light emits from the side of the array substrate or the side of the color filter substrate. The viewing angles are not affected, and display effect is better when a double-sided display is implemented.

Preferably, a projected area of the first subpixel on the first array substrate is equal to a projected area of the second subpixel on the second array substrate. That is, each of the pixel units is divided into two subpixels which have the same area, thereby avoiding the problem of color shift when the pixel units are nonuniformly divided.

In conjunction with FIG. 4, preferably, each of the pixel units comprises a thin film transistor disposed therein. A control end of the thin film transistor is connected to one of the scan lines 11. An input end of the thin film transistor is connected to one of the data lines 12. An output end of the thin film transistor is connected to the first subpixel and the second subpixel. On the array substrate 10, the first pixel electrode 301 and the second pixel electrode 302 are not separated in the middle therebetween. As a result, the two subpixels may be driven by utilizing one thin film transistor, such that a charger-sharing thin film transistor and a sharing capacitor can be save and an aperture ratio is increased.

Preferably, a number of the display domains of the first subpixel is equal to a number of the display domains of the second subpixel. For example, the first subpixel comprises 4 domains, and the second subpixel comprises 4 domains. Accordingly, a display image may be more uniform, and the display effect is better.

Preferably, as shown in FIG. 5, the first common electrode 401 comprises a first horizontal trunk part 41, a first vertical trunk part 42, and first branch parts 43 (there are plural first branch parts). The first horizontal trunk part 41 and the first vertical trunk part 42 intersect vertically. The first branches parts 43 extend outwardly from the first horizontal trunk part 41 and the first vertical trunk part 42 and are positioned in a common electrode area which is defined by the first horizontal trunk part 41 and the first vertical trunk part 42.

As shown in FIG. 4, the second pixel electrode 302 comprises a second horizontal trunk part 51, a second vertical trunk part 52, and second branch parts 53 (there are plural second branch parts). The second horizontal trunk part 51 and the second vertical trunk part 52 intersect vertically. The second branches parts 53 extend outwardly from the second horizontal trunk part 51 and the second vertical trunk part 52 and are positioned in a pixel electrode area which is defined by the second horizontal trunk part 51 and the second vertical trunk part 52. The first common electrode 401 and the second pixel electrode 302 have the above-mentioned structures and can acquire a uniform field and better display effect when compared with other structures.

The present invention further provides another liquid crystal display panel. A difference with the above-mentioned liquid crystal display panel is that the first subpixel comprises a plurality of display domains, and the display domains of the first subpixel are formed by patterning the first pixel electrode 301; the second subpixel comprises a plurality of display domains, and the display domains of the second subpixel are formed by patterning the second common electrode 402.

The second common electrode 402 comprises a third horizontal trunk part, a third vertical trunk part, and third branch parts (there are plural third branch parts). The third horizontal trunk part and the third vertical trunk part intersect vertically. The third branch parts extend outwardly from the third horizontal trunk part and the third vertical trunk part and are positioned in a common electrode area (not shown) which is defined by the third horizontal trunk part and the third vertical trunk part.

The first pixel electrode 301 comprises a fourth horizontal trunk part, a fourth vertical trunk part, and fourth branch parts (there are plural fourth branch parts). The fourth horizontal trunk part and the fourth vertical trunk part intersect vertically. The fourth branch parts extend outwardly from the fourth horizontal trunk part and the fourth vertical trunk part and are positioned in a pixel electrode area (not shown) which is defined by the fourth horizontal trunk part and the fourth vertical trunk part.

In the present invention, the display domains are formed by patterning the pixel electrode of one of the subpixels and the common electrode of the other of the subpixels. Accordingly, the viewing angles are the same when a double-sided display is implemented, thereby avoiding the problem that the viewing angles are different when pixel electrodes of two subpixels are patterned in the prior art and improving the display effect. Furthermore, each of the pixel units is divided into two subpixels which have the same area, such that the problem of wide-angle color shift can be solved. Moreover, the two subpixels can be driven by utilizing one thin film transistor, such that a charger-sharing thin film transistor and a sharing capacitor in the prior art can be save and the aperture ratio is increased.

The present invention further provides a liquid crystal display device, which comprises a backlight module and one of the above-mentioned liquid crystal display panels.

The liquid crystal display panels are described in detail as mentioned above and thus not repeated herein.

In the liquid crystal display panel and device of the present invention, the display domains patterns are formed by patterning the electrodes on the two substrates, thereby solving the technical problem that the display effect is poor when the double-sided display is implemented.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A liquid crystal display panel, comprising:
    data lines, scan lines, and a plurality of pixel units which are defined by the data lines and the scan lines, each of the pixel units comprising a first subpixel and a second subpixel;
    the first subpixel comprising:
    a first array substrate comprising a first pixel electrode;
    a liquid crystal layer; and
    a first color filter substrate disposed corresponding to the first array substrate and comprising a first common electrode;
    the second subpixel comprising:
    a second array substrate comprising a second pixel electrode;
    the liquid crystal layer; and
    a second color filter substrate disposed corresponding to the second array substrate and comprising a second common electrode;
    wherein the first subpixel comprises a plurality of display domains, and the display domains of the first subpixel are formed by patterning only the first common electrode;
    the second subpixel comprises a plurality of display domains, and the display domains of the second subpixel are formed by patterning only the second pixel electrode.

2. The liquid crystal display panel of claim 1, wherein a projected area of the first subpixel on the first array substrate is equal to a projected area of the second subpixel on the second array substrate.

3. The liquid crystal display panel of claim 1, wherein the pixel unit comprises a thin film transistor disposed therein, a control end of the thin film transistor is connected to one of the scan lines, an input end of the thin film transistor is connected to one of the data lines, and an output end of the thin film transistor is connected to the first subpixel and the second subpixel.

4. The liquid crystal display panel of claim 1, wherein a number of the display domains of the first subpixel is equal to a number of the display domains of the second subpixel.

5. The liquid crystal display panel of claim 1, wherein the first common electrode comprises a first horizontal trunk part, a first vertical trunk part, and first branch parts; the first horizontal trunk part and the first vertical trunk part intersect vertically, and the first branch parts extend outwardly from the first horizontal trunk part and the first vertical trunk part and are positioned in a common electrode area which is defined by the first horizontal trunk part and the first vertical trunk part;
    the second pixel electrode comprises a second horizontal trunk part, a second vertical trunk part, and second branch parts; the second horizontal trunk part and the second vertical trunk part intersect vertically, and the second branch parts extend outwardly from the second horizontal trunk part and the second vertical trunk part and are positioned in a pixel electrode area which is defined by the second horizontal trunk part and the second vertical trunk part.

6. A liquid crystal display panel, comprising:
    data lines, scan lines, and a plurality of pixel units which are defined by the data lines and the scan lines, each of the pixel units comprising a first subpixel and a second subpixel;
    the first subpixel comprising:
    a first array substrate comprising a first pixel electrode;
    a liquid crystal layer; and
    a first color filter substrate disposed corresponding to the first array substrate and comprising a first common electrode;
    the second subpixel comprising:
    a second array substrate comprising a second pixel electrode;
    the liquid crystal layer; and
    a second color filter substrate disposed corresponding to the second array substrate and comprising a second common electrode;
    wherein the first subpixel comprises a plurality of display domains, and the display domains of the first subpixel are formed by patterning only the first pixel electrode;
    the second subpixel comprises a plurality of display domains, and the display domains of the second subpixel are formed by patterning only the second common electrode.

7. The liquid crystal display panel of claim 6, wherein a projected area of the first subpixel on the first array substrate is equal to a projected area of the second subpixel on the second array substrate.

8. The liquid crystal display panel of claim 6, wherein the pixel unit comprises a thin film transistor disposed therein, a control end of the thin film transistor is connected to one of the scan lines, an input end of the thin film transistor is connected to one of the data lines, and an output end of the thin film transistor is connected to the first subpixel and the second subpixel.

9. The liquid crystal display panel of claim 6, wherein a number of the display domains of the first subpixel is equal to a number of the display domains of the second subpixel.

10. The liquid crystal display panel of claim 6, wherein the second common electrode comprises a third horizontal trunk part, a third vertical trunk part, and third branch parts; the third horizontal trunk part and the third vertical trunk part intersect vertically, and the third branch parts extend outwardly from the third horizontal trunk part and the third vertical trunk part and are positioned in a common electrode area which is defined by the third horizontal trunk part and the third vertical trunk part;
    the first pixel electrode comprises a fourth horizontal trunk part, a fourth vertical trunk part, and fourth branch parts; the fourth horizontal trunk part and the fourth vertical trunk part intersect vertically, and the fourth branch parts extend outwardly from the fourth horizontal trunk part and the fourth vertical trunk part and are positioned in a pixel electrode area which is defined by the fourth horizontal trunk part and the fourth vertical trunk part.

11. A liquid crystal display device, comprising:
a backlight module and a liquid crystal display panel;
wherein the liquid crystal display panel comprises:
data lines, scan lines, and a plurality of pixel units which are defined by the data lines and the scan lines, each of the pixel units comprises a first subpixel and a second subpixel;
the first subpixel comprises:
a first array substrate comprising a first pixel electrode;
a liquid crystal layer; and
a first color filter substrate disposed corresponding to the first array substrate and comprising a first common electrode;
the second subpixel comprises:
a second array substrate comprising a second pixel electrode;
the liquid crystal layer; and
a second color filter substrate disposed corresponding to the second array substrate and comprising a second common electrode;
wherein the first subpixel comprises a plurality of display domains, and the display domains of the first subpixel are formed by patterning only the first common electrode;
the second subpixel comprises a plurality of display domains, and the display domains of the second subpixel are formed by patterning only the second pixel electrode.

12. The liquid crystal display device of claim 11, wherein a projected area of the first subpixel on the first array substrate is equal to a projected area of the second subpixel on the second array substrate.

13. The liquid crystal display device of claim 11, wherein the pixel unit comprises a thin film transistor disposed therein, a control end of the thin film transistor is connected to one of the scan lines, an input end of the thin film transistor is connected to one of the data lines, and an output end of the thin film transistor is connected to the first subpixel and the second subpixel.

14. The liquid crystal display device of claim 11, wherein a number of the display domains of the first subpixel is equal to a number of the display domains of the second subpixel.

15. The liquid crystal display device of claim 11, wherein the first common electrode comprises a first horizontal trunk part, a first vertical trunk part, and first branch parts; the first horizontal trunk part and the first vertical trunk part intersect vertically, and the first branch parts extend outwardly from the first horizontal trunk part and the first vertical trunk part and are positioned in a common electrode area which is defined by the first horizontal trunk part and the first vertical trunk part;

the second pixel electrode comprises a second horizontal trunk part, a second vertical trunk part, and second branch parts; the second horizontal trunk part and the second vertical trunk part intersect vertically, and the second branch parts extend outwardly from the second horizontal trunk part and the second vertical trunk part and are positioned in a pixel electrode area which is defined by the second horizontal trunk part and the second vertical trunk part.

* * * * *